(12) United States Patent
Beaty

(10) Patent No.: US 6,588,242 B1
(45) Date of Patent: Jul. 8, 2003

(54) LOCKING FASTENER DEVICE

(76) Inventor: James H. Beaty, 2933 Bridle La., Swansea, IL (US) 62226

( * ) Notice: Subject to any disclaimer, the term of this patent is extended or adjusted under 35 U.S.C. 154(b) by 0 days.

(21) Appl. No.: 10/051,032

(22) Filed: Jan. 18, 2002

(51) Int. Cl.[7] ............................................. F16B 41/00
(52) U.S. Cl. ............................ 70/231; 70/229; 292/251
(58) Field of Search .................. 70/229–232, 163–166, 70/371; 292/251; 411/910, 396, 402

(56) References Cited

U.S. PATENT DOCUMENTS

| | | | |
|---|---|---|---|
| 6,817 A | 10/1849 | Scott | |
| 467,324 A | 1/1892 | Raybuck | |
| 1,188,305 A * | 6/1916 | Noertman | 411/409 |
| 1,609,645 A * | 12/1926 | Dewire | 411/396 |
| 1,853,162 A * | 4/1932 | Jacobi | 70/260 |
| 1,878,436 A * | 9/1932 | Burroughs | 70/168 |
| 2,377,397 A * | 6/1945 | Booth | 411/403 |
| 3,296,842 A * | 1/1967 | Auerbach et al. | 70/82 |
| 3,426,932 A * | 2/1969 | Rouse | 215/207 |
| 3,600,912 A * | 8/1971 | Foreman | 70/77 |
| 3,782,146 A * | 1/1974 | Franke | 70/232 |
| 3,832,747 A * | 9/1974 | Nankivell et al. | 470/2 |
| 3,981,617 A * | 9/1976 | Milewicz | 416/244 B |
| 4,169,308 A * | 10/1979 | Minogue | 29/407.1 |
| 4,434,736 A | 3/1984 | Szostak | |
| 4,710,082 A * | 12/1987 | Curtis | 411/373 |
| 4,809,569 A * | 3/1989 | Erb | 81/121.1 |
| 5,007,260 A * | 4/1991 | Sharp | 70/233 |
| D368,019 S | 3/1996 | Ohtsuka | |
| 5,537,893 A | 7/1996 | Snider | |
| 5,606,753 A | 3/1997 | Hashimoto | |
| 5,791,848 A * | 8/1998 | Lanham | 411/373 |
| 5,795,116 A * | 8/1998 | Frank et al. | 411/6 |
| 6,044,670 A * | 4/2000 | Citurs et al. | 70/169 |

* cited by examiner

Primary Examiner—Anthony Knight
Assistant Examiner—John B. Walsh

(57) ABSTRACT

A locking fastener device for coupling to an item. The locking fastener device includes a body member having a shaft portion and a head portion. The shaft portion is designed for selectively coupling to structure. The head portion selectively engages the shaft portion whereby the shaft portion is selectively rotatable by the head portion when the head portion is rotated by a user.

4 Claims, 2 Drawing Sheets

LOCKING FASTENER DEVICE

BACKGROUND OF THE INVENTION

1. Field of the Invention

The present invention relates to adjusting screws and more particularly pertains to a new locking fastener device for coupling to an item.

2. Description of the Prior Art

The use of adjusting screws is known in the prior art. U.S. Pat. No. 467,324 describes a device for allowing the nut to be disengaged from the bolt so that the bolt can not be easily removed. Another type of adjusting screw is U.S. Pat. No. 5,606,753 having a hexagonal head that allows the bolt to be turned in a direction for tightening the bolt and not in a direction for loosening the bolt.

SUMMARY OF THE INVENTION

An object of the present invention is to provide a new locking fastener device that allows a user to insert the shaft portion into a fixture and allow the user to disengaged the head portion from the shaft portion so that the shaft portion can not be rotated.

To this end, the present invention generally comprises a body member having a shaft portion and a head portion. The shaft portion is designed for selectively coupling to structure. The head portion selectively engages the shaft portion whereby the shaft portion is selectively rotatable by the head portion when the head portion is rotated by a user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
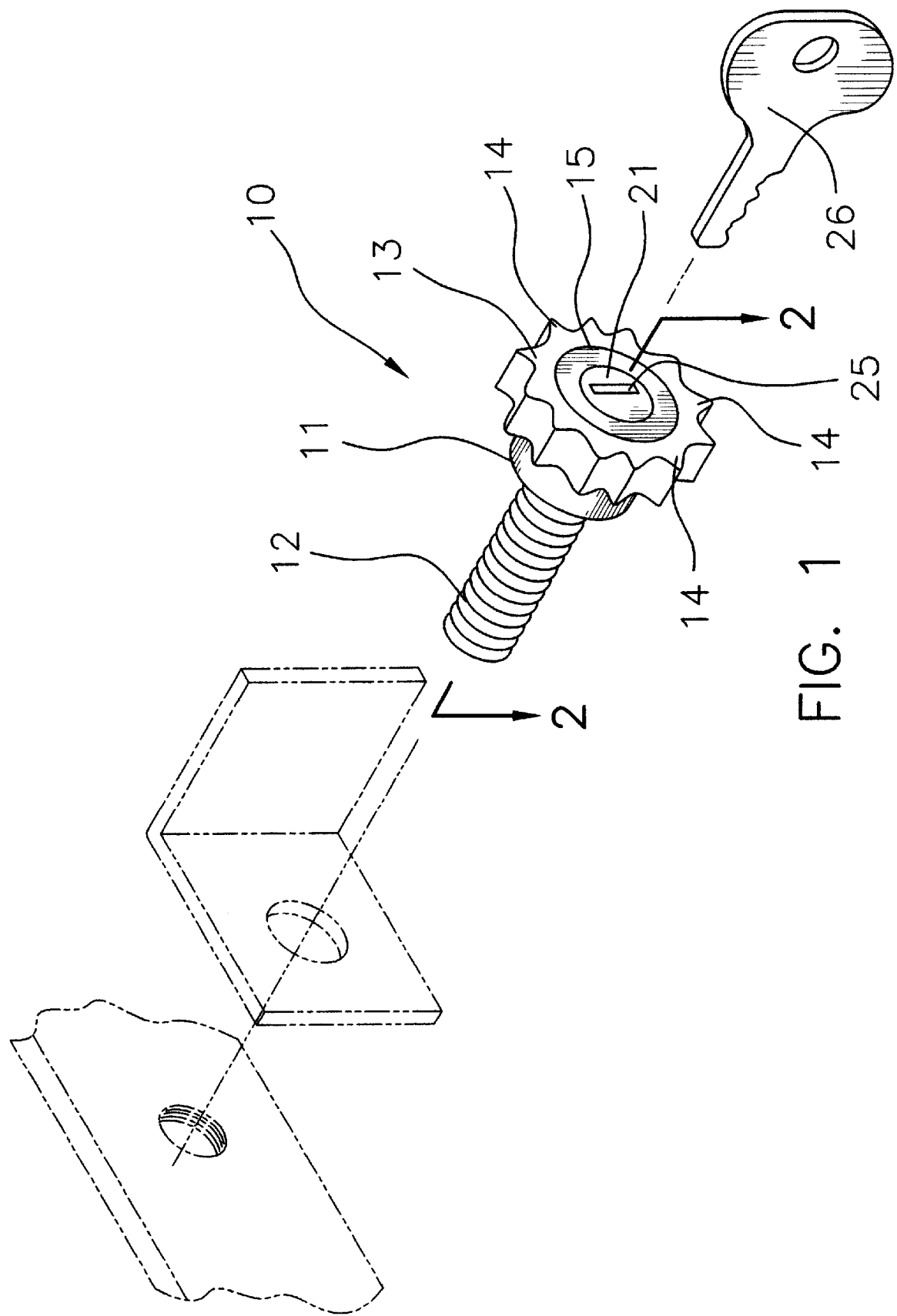
FIG. 1 is an exploded perspective view of a new locking fastener device according to the present invention.
Figure 2:
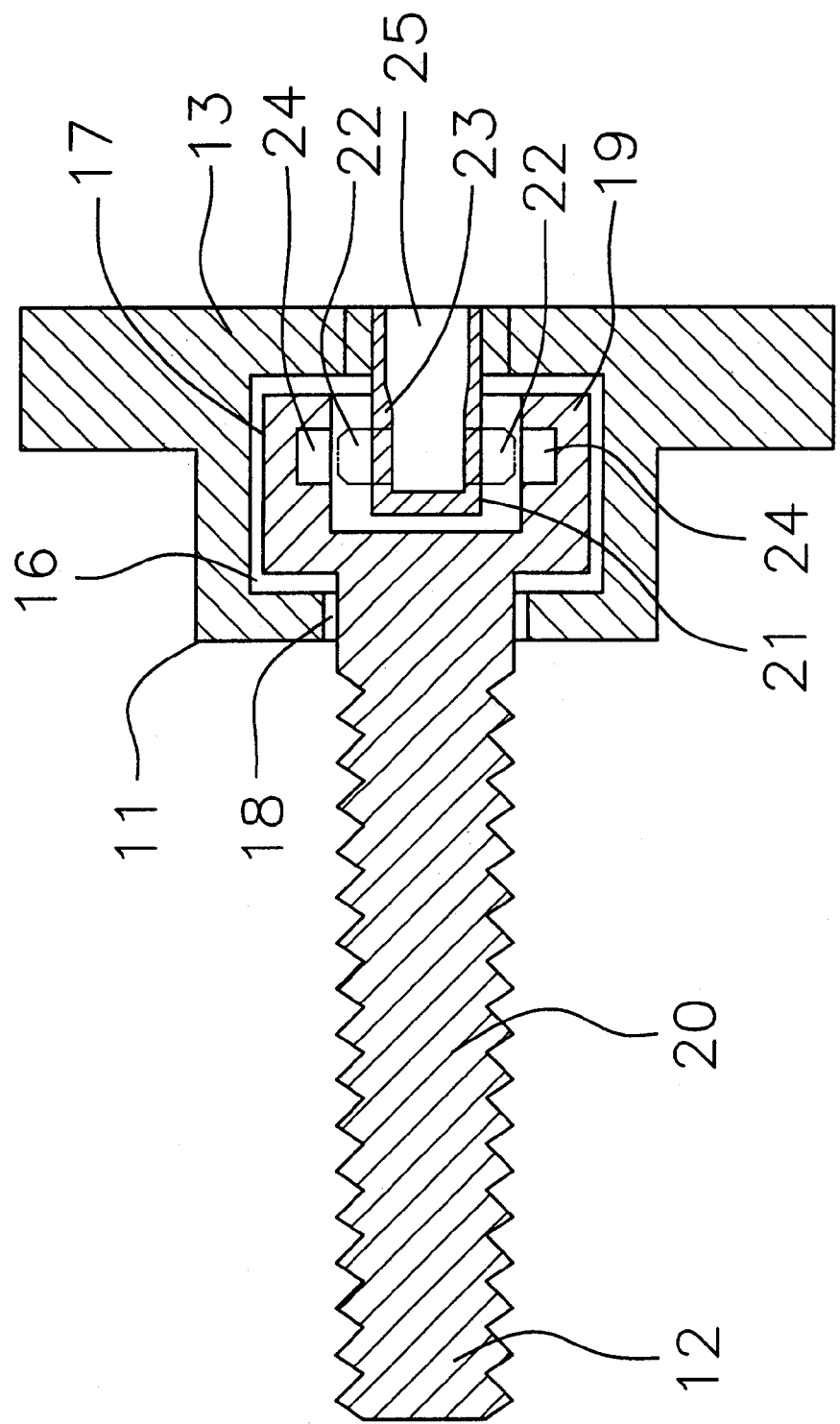
FIG. 2 is a cross-sectional view of the present invention taken along line 2—2 of FIG. 1.

With reference now to the drawings, and in particular to FIGS. 1 and 2 thereof, a new locking fastener device embodying the principles and concepts of the present invention and generally designated by the reference numeral 10 will be described.

As best illustrated in FIGS. 1 and 2, the locking fastener device 10 generally comprises a body member 11 having a shaft portion 12 and a head portion 13. The shaft portion 12 is designed for selectively coupling to a structure. The head portion 13 selectively engages the shaft portion 12 whereby the shaft portion 12 is selectively rotatable by the head portion 13 when the head portion 13 is rotated by a user.

A plurality of extension portions 14 are radially positioned around a perimeter edge 15 of the head portion 13. The extension portions 14 are designed for enhancing the traction of a hand of the user when the user is rotating the head portion 13 to rotate the shaft portion 12.

The head portion 13 of the body member 11 has a bore 16. The bore 16 extends partially through of the head portion 13. The shaft portion 12 of the body member 11 is positioned in the bore 16 of the head portion 13. The bore 16 of the head portion 13 has a first portion 17 and a second portion 18. The first portion 17 of the bore 16 has a diameter greater than a diameter of the second portion 18 of the bore 16. The second portion 18 of the bore 16 extending from a rear face of the head portion 13.

The shaft portion 12 of the body member 11 has an end portion 19 and a main portion 20. The end portion 19 of the shaft member has a diameter greater than a diameter of the main portion 20 of the shaft member. The end portion 19 of the shaft portion 12 is positioned in the first portion 17 of the bore 16 of the head portion 13. The diameter of the head portion 13 is greater than the diameter of the second portion 18 of the bore 16 for preventing inadvertent removal of the shaft portion 12 from the bore 16 of the head portion 13.

A locking assembly 21 is coupled to the head portion 13 of the body member 11. The locking assembly 21 extends into the end portion 19 of the shaft portion 12 of the body member 11. The locking assembly 21 is for selectively engaging the end portion 19 of the shaft portion 12 for permitting rotation of the shaft portion 12 when the head portion 13 is rotated by the user and the locking assembly 21 engages the shaft portion 12.

The locking assembly 21 has a plurality of the locking tabs 22. The locking tabs 22 selectively extend from a base portion 23 of the of the locking assembly 21. Each of the locking tabs 22 selectively engages one of a plurality of locking apertures 24 in the end portion 19 of the shaft portion 12 for permitting rotation of the shaft portion 12 when the head portion 13 is rotated by the user and the locking tabs 22 of the locking assembly 21 are engaged to the locking apertures 24 of the shaft member.

The locking assembly 21 has a key slot 25. The key slot 25 permits a key 26 to be inserted into the base portion 23 of the locking assembly 21. The key 26 is for extending the locking tabs 22 from the base portion 23 of the locking assembly 21 for engaging the locking tabs 22 of the locking assembly 21 to the locking apertures 24 of the shaft portion 12 when the key 26 is inserted into the locking assembly 21.

In use, the user inserts the key 26 into the locking assembly 21. The key 26 causes the locking tabs 22 to engage the locking apertures 24. The head portion 13 can then be rotated to rotate the shaft portion 12 to secure the shaft portion 12 to the support surface. The key 26 is then removed which releases the locking tabs 22 from the locking apertures 24 and allows the head portion 13 to spin independently of the shaft portion 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking fastener device for fastening objects together, the locking fastener device comprising:

a body member having a shaft portion and a head portion, said shaft portion being adapted for selectively coupling to structure, said head portion selectively engaging said shaft portion such that said shaft portion is selectively rotatable by said head portion when said head portion is rotated by a user;

said head portion of said body member having a bore, said bore extending partially through said head portion, said shaft portion of said body member being positioned in said bore of said head portion;

said bore of said head portion having a first portion and a second portion, said first portion of said bore having a diameter greater than a diameter of said second portion of said bore, said second portion of said bore extending from a rear face of said head portion;

said shaft portion of said body member having an end portion and a main portion, said end portion of said shaft member having a diameter greater than a diameter of said main portion of said shaft member, said end portion of said shaft portion being positioned in said first portion of said bore of said head portion, said diameter of said head portion being greater than said diameter of said second portion of said bore for preventing inadvertent removal of said shaft portion from said bore of said head portion;

a locking assembly being coupled to said head portion of said body member, said locking assembly extending into said end portion of said shaft portion of said body member, said locking assembly being for selectively engaging said end portion of said shaft portion for permitting rotation of said shaft portion when said head portion is rotated by the user and said locking assembly engages said shaft portion; and said locking assembly having a plurality of locking tabs, said locking tabs selectively extending from a base portion of said locking assembly, each of said locking tabs selectively engaging one of a plurality of locking apertures in said end portion of said shaft portion for permitting rotation of said shaft portion when said head portion is rotated by the user and said locking tabs of said locking assembly are engaged to said locking apertures of said shaft member.

2. The locking fastener device as set forth in claim 1, further comprising:

a plurality of extension portions being radially positioned around a perimeter edge of said head portion, said extension portions being adapted for enhancing the traction for a hand of the user when the user is rotating said head portion to rotate said shaft portion.

3. The locking fastener device as set forth in claim 1, further comprising:

said locking assembly having a key slot, said key slot permitting a key to be inserted into said base portion of said locking assembly, said key being for extending said locking tabs from said base portion of said locking assembly to said locking apertures of said shaft portion when said key is inserted into said locking assembly.

4. A locking fastener device for fastening objects together, the locking fastener device comprising:

a body member having a shaft portion and a head portion, said shaft portion being adapted for selectively coupling to a structure, said head portion selectively engaging said shaft portion such that said shaft portion is selectively rotatable by said head portion when said head portion is rotated by a user;

a plurality of extension portions being radially positioned around a perimeter edge of said head portion, said extension portions being adapted for enhancing the traction for a hand of the user when the user is rotating said head portion to rotate said shaft portion;

said head portion of said body member having a bore, said bore extending partially through said head portion, said shaft portion of said body member being positioned in said bore of said head portion;

said bore of said head portion having a first portion and a second portion, said first portion of said bore having a diameter greater than a diameter of said second portion of said bore, said second portion of said bore extending from a rear face of said head portion;

said shaft portion of said body member having an end portion and a main portion, said end portion of said shaft member having a diameter greater than a diameter of said main portion of said shaft member, said end portion of said shaft portion being positioned in said first portion of said bore of said head portion, said diameter of said head portion being greater than said diameter of said second portion of said bore for preventing inadvertent removal of said shaft portion from said bore of said head portion;

a locking assembly being coupled to said head portion of said body member, said locking assembly extending into said end portion of said shaft portion of said body member, said locking assembly being for selectively engaging said end portion of said shaft portion for permitting rotation of said shaft portion when said head portion is rotated by the user and said locking assembly engages said shaft portion;

said locking assembly having a plurality of locking tabs, said locking tabs selectively extending from a base portion of said locking assembly, each of said locking tabs selectively engaging one of a plurality of locking apertures in said end portion of said shaft portion for permitting rotation of said shaft portion when said head portion is rotated by the user and said locking tabs of said locking assembly are engaged to said locking apertures of said shaft member; and said locking assembly having a key slot, said key slot permitting a key to be inserted into said base portion of said locking assembly, said key being for extending said locking tabs from said base portion of said locking assembly to said locking apertures of said shaft portion when said key is inserted into said locking assembly.

* * * * *